(12) United States Patent
Lee et al.

(10) Patent No.: US 11,624,913 B2
(45) Date of Patent: Apr. 11, 2023

(54) OPTICAL DISPLAY SYSTEM WITH ENHANCED RESOLUTION, METHODS, AND APPLICATIONS

(71) Applicant: University of Central Florida Research Foundation, Inc., Orlando, FL (US)

(72) Inventors: Yun-Han Lee, Orlando, FL (US); Tao Zhan, Orlando, FL (US); Guanjun Tan, Orlando, FL (US); Fangwang Gou, Orlando, FL (US); Fenglin Peng, Orlando, FL (US); Shin-Tson Wu, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 231 days.

(21) Appl. No.: 16/624,483

(22) PCT Filed: Jun. 22, 2017

(86) PCT No.: PCT/US2017/038749
§ 371 (c)(1),
(2) Date: Dec. 19, 2019

(87) PCT Pub. No.: WO2018/236379
PCT Pub. Date: Dec. 27, 2018

(65) Prior Publication Data
US 2020/0110267 A1    Apr. 9, 2020

(51) Int. Cl.
G02B 27/01    (2006.01)
G02B 27/28    (2006.01)
(Continued)

(52) U.S. Cl.
CPC .......... *G02B 27/0172* (2013.01); *G02B 5/30* (2013.01); *G02B 27/28* (2013.01); *G02B 27/286* (2013.01); *G02B 27/4205* (2013.01); *G02F 1/292* (2013.01)

(58) Field of Classification Search
CPC ............ G02B 27/0172; G02B 27/0101; G02B 2027/0178; G02B 27/017; G02B 27/0149; G02B 2027/0123; G02B 27/01; G02B 2027/0187; G02B 2027/0118; G02B 2027/0127; G02B 2027/014; G02B 2027/015; G02B 27/0176; G02B 2027/011; G02B 2027/0138; G02B 27/0093;
(Continued)

(56) References Cited

U.S. PATENT DOCUMENTS

| 6,184,969 B1 * | 2/2001 | Fergason | G02F 1/13363 349/196 |
| 2005/0105016 A1 * | 5/2005 | Kurihara | H04N 9/3108 349/96 |
| 2017/0261746 A1 * | 9/2017 | Tam | H04N 13/332 |

* cited by examiner

*Primary Examiner* — Collin X Beatty
*Assistant Examiner* — Grant A Gagnon
(74) *Attorney, Agent, or Firm* — Fleit Intellectual Property Law; Jeffrey N. Giunta

(57) ABSTRACT

An optical display system includes an information display (image-generating) component, a polarization dependent image offset optical element and possibly also a polarization rotator. By controlling the image offset optical element either by direct applying voltage or by controlling the polarization of the displayed light through the polarization rotator, the display pixels can be switched by a certain portion. By switching between offset and non-offset state with appropriate image displayed, the resolution as observed by the users can be enhanced.

9 Claims, 5 Drawing Sheets

(51) Int. Cl.
*G02B 5/30* (2006.01)
*G02B 27/42* (2006.01)
*G02F 1/29* (2006.01)

(58) Field of Classification Search
CPC .... G02B 2027/0154; G02B 2027/0156; G02B 5/30; G02B 2027/0112; G02B 2027/0125; G02B 2027/0132; G02B 6/00; G02B 2027/0141; G02B 2027/0161; G02B 3/0006; G02B 2027/0134; G02B 2027/0152; G02B 2027/0169; G02B 2027/0174; G02B 26/10; G02B 5/02; G02B 5/18; G02B 2027/0121; G02B 27/0179; G02B 5/32; G02B 6/0031; G02B 17/0642; G02B 17/0663; G02B 2027/0114; G02B 2027/013; G02B 2027/0145; G02B 23/125; G02B 26/0833; G02B 27/0081; G02B 27/0103; G02B 27/141; G02B 27/144; G02B 27/283; G02B 5/04; G02B 5/10; G02B 6/0018; G02B 6/0035; G02B 6/0055; G02B 7/004; G02B 7/04; G02B 7/1822; G02B 17/006; G02B 17/02; G02B 17/0816; G02B 17/086; G02B 2027/012; G02B 2027/0147; G02B 2027/0159; G02B 2027/0167; G02B 2027/0181; G02B 2027/0183; G02B 2027/0194; G02B 2027/0196; G02B 2027/0198; G02B 23/10; G02B 23/105; G02B 25/001; G02B 26/101; G02B 26/105; G02B 27/0006; G02B 27/0018; G02B 27/0025; G02B 27/0075; G02B 27/0189; G02B 27/022; G02B 27/1006; G02B 27/1073; G02B 27/1086; G02B 27/12; G02B 27/14; G02B 27/142; G02B 27/145; G02B 27/286; G02B 27/4205; G02B 27/4272; G02B 27/44; G02B 27/48; G02B 30/26; G02B 30/27; G02B 30/34; G02B 30/52; G02B 30/60; G02B 3/0037; G02B 3/0043; G02B 3/0056; G02B 3/08; G02B 3/12; G02B 5/0242; G02B 5/0257; G02B 5/0278; G02B 5/045; G02B 5/085; G02B 5/1842; G02B 5/1847; G02B 5/1861; G02B 5/205; G02B 5/22; G02B 6/0033; G02B 6/0046; G02B 6/005; G02B 6/0065; G02B 6/0076; G02B 6/10; G02B 6/124; G02B 6/34; G02B 7/002; G02B 7/005; G02B 7/007; G02B 7/022; G02B 7/026; G02B 7/1821; G02F 1/133528; G02F 1/1313; G02F 1/133351; G02F 1/13355; G02F 1/133621; G02F 1/1362; G02F 1/1533

USPC .......................................................... 359/630
See application file for complete search history.

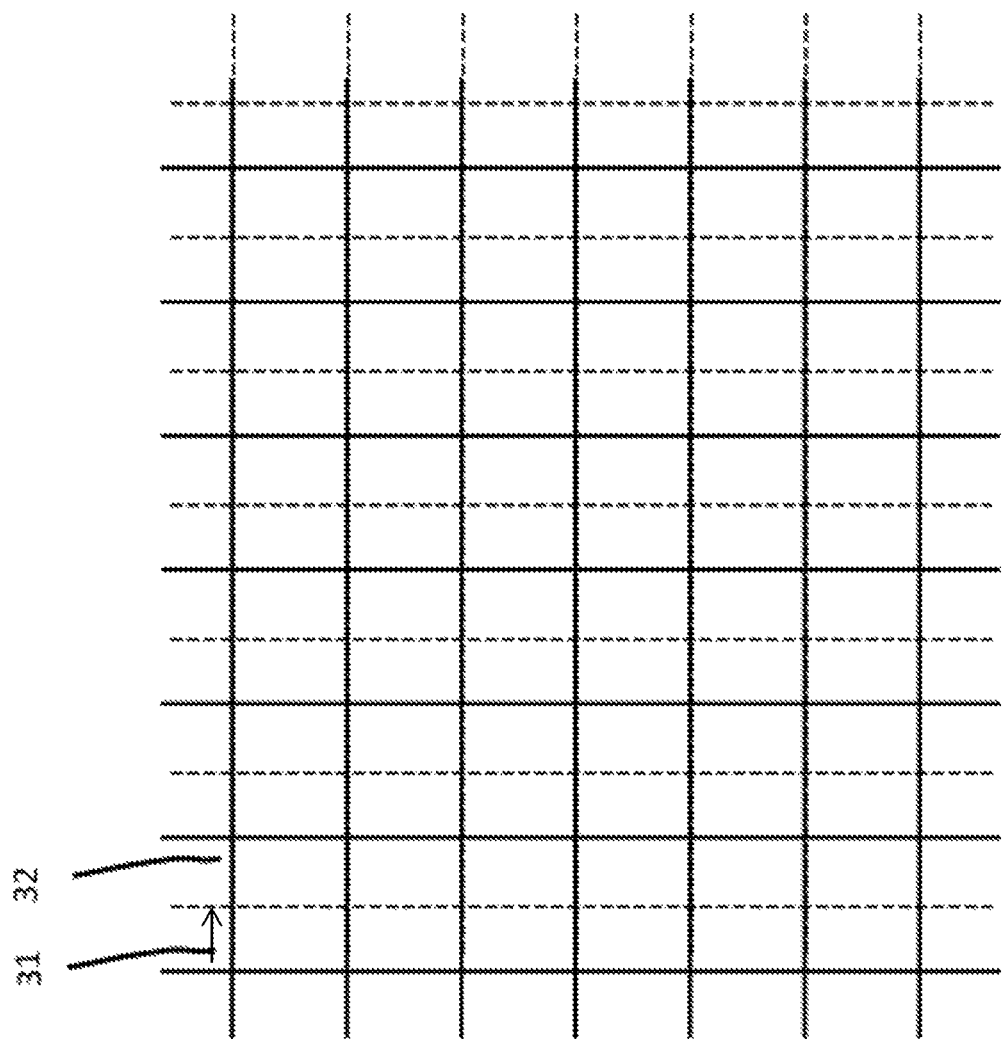

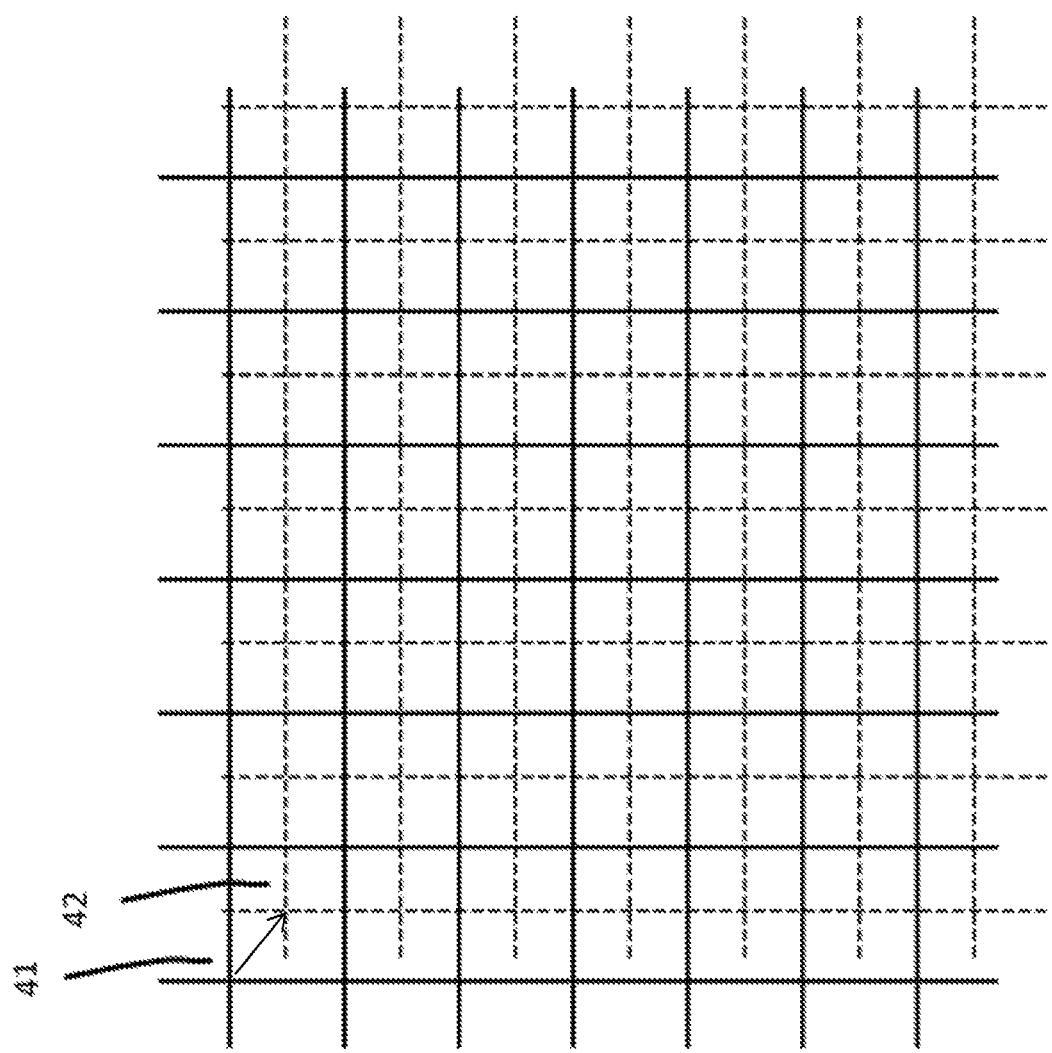

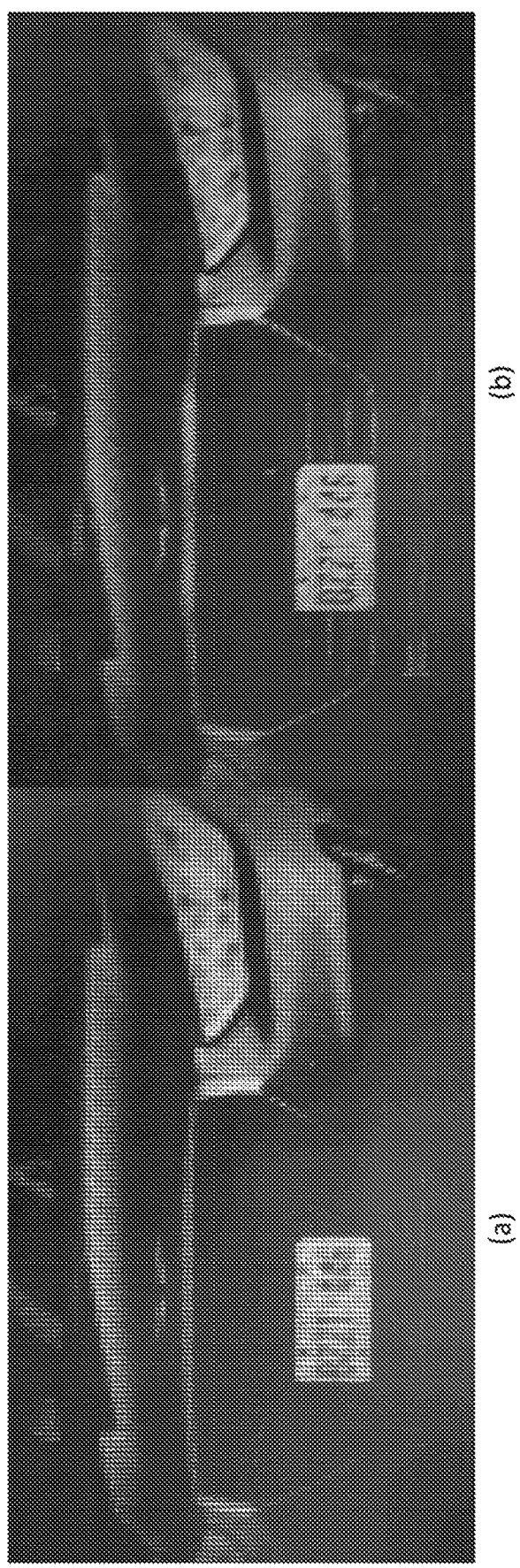

OPTICAL DISPLAY SYSTEM WITH ENHANCED RESOLUTION, METHODS, AND APPLICATIONS

FEDERALLY SPONSORED RESEARCH

The invention was made with funding from the AFOSR under project 6501-6269. The U.S. government has certain rights in the invention.

BACKGROUND

Aspects and embodiments of the invention pertain to optical display systems. Particular embodiments pertain to augmented reality systems that include a controllable optical image-generating apparatus and an optical image-viewing apparatus, associated methods, and applications thereof and to virtual reality systems that include a controllable optical image display/view apparatus, associated methods, and applications thereof. More particularly, aspects and embodiments of the invention pertain to optical display systems, and associated methods, in which a display (viewable) pixels can be offset by a portion of a pixel width. Applications include but are not limited to wearable display devices including virtual and/or augmented reality devices.

Virtual reality is an emerging wearable display technology for applications including but not limited to immersive video games and interactive three-dimensional (3D) graphics. A critical issue with these types of display devices is the low image resolution. Due to the high angular resolution of human eye (~1 arcminute, when a display panel is magnified with a lens, as in cases of virtual reality headsets such as HTC Vive, Google cardboard/daydream or Oculus Rift, the pixel resolution of a 2160×1200 panel can only provide an angular resolution of ~5.5 arcmin (for each eye). Even when the display panel is improved to 4320×2400, the resolution is improved to ~2.75 arcmin. In order to achieve the high angular resolution of human eye (~1 arcminute), the minimal required resolution would be 11880×6600.

Another possible approach to enhance resolution and thus the user experience without altering the display panel is to produce an offset to the display pixels in time domain, such as in U.S. Pat. Nos. 5,369,266 and 6,243,055 B1, where one or more birefringent crystal plates are used to produce an offset for different polarized light to create an offset of ~half pixel. At least a polarization rotator is needed to switch between two polarization states. Through time-multiplexing (i.e., display an image for the first frame, and an offset image for the second, offset frame), effectively doubled-resolution display can be obtained.

U.S. Pat. No. 5,689,283 discloses an optical device based on the same time-multiplexing concept. In this device, the pixel offset is realized through a rotating prism-array. A similar design is disclosed in US Patent 2004/0041784 A1.

However, the abovementioned devices and associated methods are only suitable for projection systems, where the form-factor is not critical. They are impractical for the requirements of compact, head-mounted displays.

More recently, a super-resolution display was proposed in [F. Heide, D. Lanman, D. Reddy, J. Kautz, K. Pulli, D, Luebke, "Cascaded Displays: Spatiotemporal Superresolution using Offset Pixel Layers," ACM Transactions on Graphics, Vol. 33, No. 4, Article 60, (2014)] by stacking LCD panels with offset pixels. Although the device is relatively compact, significant light loss is inevitable due to the low transmittance of LCD panels.

The inventors have thus recognized the advantages and benefits of an image resolution enhancement apparatus and method that is optically and mechanically simpler, lighter, less expensive, and better performing than what is currently available.

SUMMARY

An aspect of the present invention is an optical display/viewing system. In an exemplary, non-limiting embodiment the optical display system includes a controllable optical image-generating display apparatus and an optical image viewing apparatus. In a non-limiting exemplary embodiment, the optical image-generating apparatus has an optical axis and includes a programmable/controllable (virtual) image-generating component adapted to generate a polarized image output; a lens disposed to magnify and collimate the image-generating component, and an image offset component disposed to accept the collimated image output. In various non-limiting embodiments, the optical display system may include, alone or in various combinations as one skilled in the art would understand, the following limitations, features, characteristics and/or elements:
wherein the polarized image output is one of linear and circular polarized;
wherein the image offset component is an electrically switchable, diffractive liquid crystal wave-plate;
further comprising a polarization rotator,
further comprising a support structure such that the optical display system is wearable by a viewer.

BRIEF DESCRIPTION OF THE FIGURES

FIG. 3 is a sketch showing one possible shifting direction of pixels, according to an illustrative embodiment.

FIG. 4 is a sketch showing another possible shifting direction of pixels, according to an illustrative embodiment.

FIG. 5 photographically shows a preliminary experimental result of an embodied device exploiting a resolution enhancement technique, according to an illustrative embodiment.

DESCRIPTION OF NON-LIMITING. EXEMPLARY EMBODIMENTS

Figure 1:
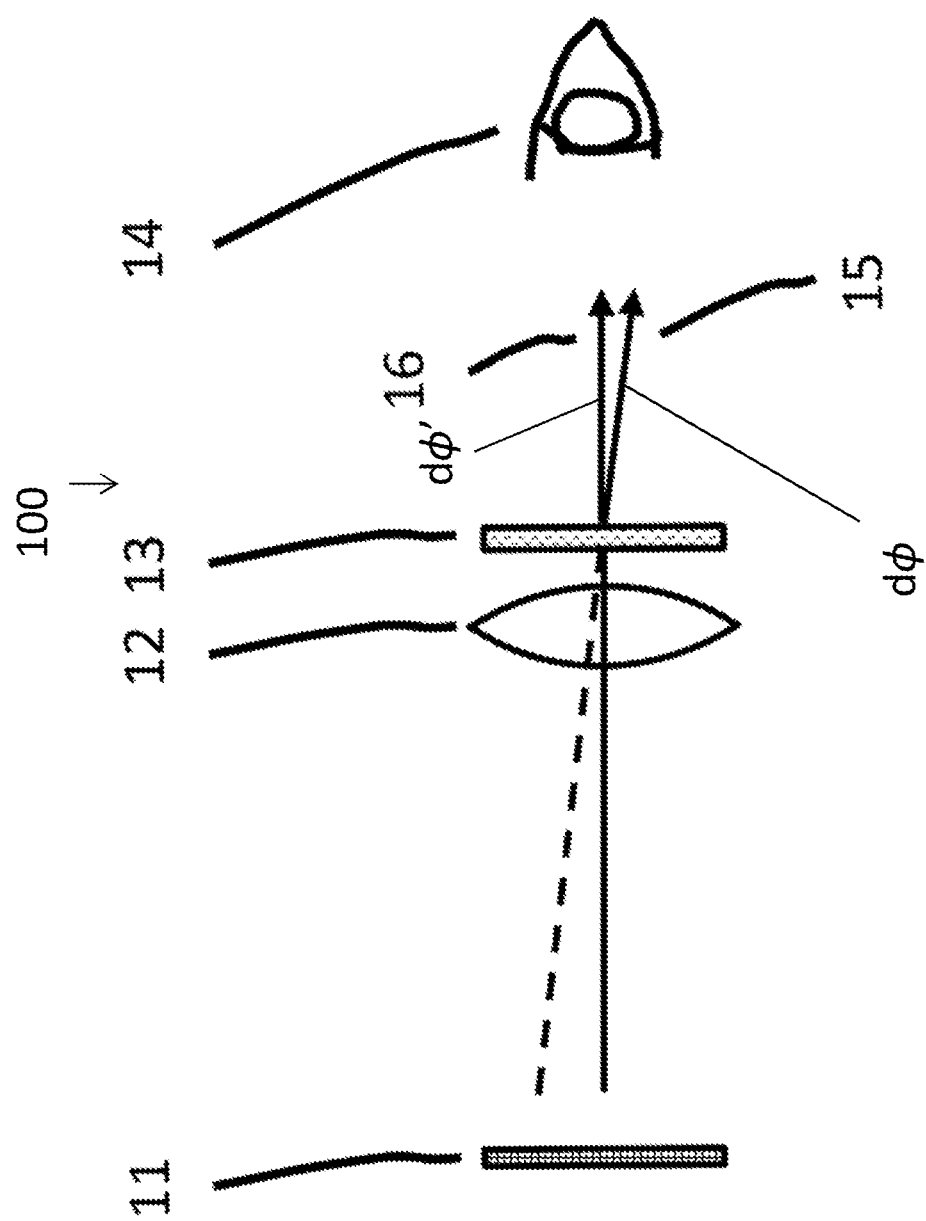
FIG. 1 is a top schematic plan view of an optical display system according to an exemplary virtual reality application embodiment of the invention.

FIG. 1 schematically illustrates an optical display system 100. The display system comprises a programmable/controllable (virtual image) display component 11 that is optically followed by a lens 12 and an electrically switchable image offset component 13. The displayed image is presented to observer's eye 14 (not part of the invention per se) for viewing.

The display component 11 can be a LCD display, a LCoS display, a micro-LED display, an OLED display, a fiber scanning display, or other display component as known in the art. The display component outputs or is adapted to output a polarized light (virtual) image, most advantageously a linearly polarized or circularly polarized image. Typically, display components such as LCD and LCoS displays produce polarized outputs. If the display output is not inherently polarized, as produced by, e.g., a micro-LED display, an OLED display, or a fiber scanning display, a polarizer, advantageously a reflective polarizer (not shown) may be disposed on the output side of the display component as known in the art to effect a desired polarization state image output.

The lens 12 can be a plano-convex lens, a biconvex lens, an aspheric lens or a Fresnel lens. This lens serves to magnify and project the display image to a proper viewable distance which is preferably in the range from 0 to 3 diopters.

The polarization dependent optical component 13, advantageously a liquid crystal diffractive wave-plate similar to that disclosed in [Svetlana Serak, Nelson Tabiryan, and Boris Zeldovich, "High-efficiency 1.5 μm thick optical axis grating and its use for laser beam combining," Opt. Lett. 32, 169-171 (2007)] serves to deflect the input circularly polarized light by a small angle, $d\phi$, 15. When voltage is applied, the deflected angle is changed to a different value, $d\phi'$, 16. Most advantageously, $d\phi'=0$ (i.e., when applying voltage, the light is not deflected) and hence the change in deflection angle is simply $d\phi$. When the display image is magnified by the lens 12, it is more convenient to describe the pixel density by its angular size, $d\theta$. For example, if a pixel is 40 μm in width (w), when magnified by a lens with a 4 cm focal length (f) to very far, ~0 diopter (nearly infinity), the angular size of the pixel will be $d\theta \cong w/f=40/40000=0.001$ rad$\cong 0.0573°$ or 3.4 arcmin. Other settings of the display and lens can provide different $d\theta$ values for a desired effect. When a voltage is applied to the diffractive liquid crystal wave-plate, it induces a shift in pixel deflection angle, $d\phi$, in angular space. This shift can be set so that all pixels move vertically or horizontally by the pixels' half angular size ($d\theta/2$), such as shown in FIG. 3 (which only shows the case of shifting in horizontal direction, but the same applies to vertical shifting). By switching on and off repeatedly, the pixels can be switched between the original location (solid lines) 31 as frame 1, and the shifted location (dashed lines) 32 as frame 2. This shift can also be set to move pixels diagonally (45° with respect to a unit pixel) by approximated $\sqrt{2} \times d\theta$ as shown in FIG. 4. By switching on and off repeatedly, the pixels can be switched between the original location (solid lines) 41 as frame 1, and the shifted location (dashed lines) 42 as frame 2. Therefore, through the modulation of the voltage, spatial-shifting of the pixels can be realized. By dividing one high resolution image into two sub-frames, frame 1 and frame 2, one can provide computationally optimized images in frame 1 and frame 2 with one of the frames being shifted. The combination of these two frames of the computationally optimized image will then provide enhanced resolution of the viewed image. Advantageously, the switching of the polarization dependent optical component will be synchronized with the computed display sub-frame images such that the polarization dependent optical component is switched on when frame 1 is displayed and the polarization dependent optical component is switched off when frame 2 is displayed.

Figure 2:
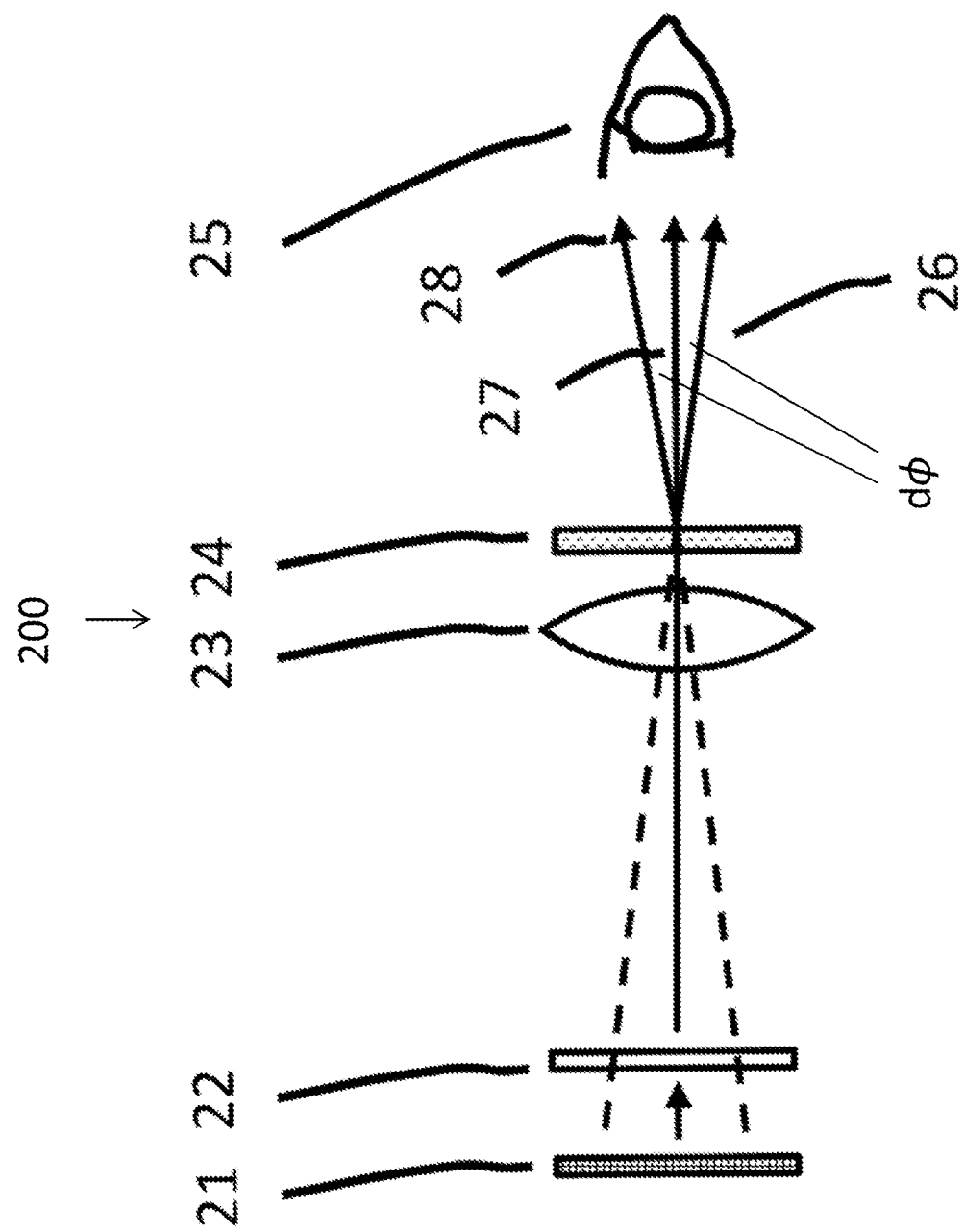
FIG. 2 is a top schematic plan view of an optical display system according to an exemplary virtual reality application embodiment of the invention.

FIG. 2 schematically illustrates another embodied optical display system 200. The display system comprises a programmable/controllable (virtual image) display component 21 that is optically followed by a polarization rotator 22. The polarization rotator is optically followed by a lens 23, and then followed by an image offset component 24. The displayed image is presented to an observer's eye 25 for viewing.

The display component 21 can be a LCD display, a LCoS display, a micro-LED display, an OLED display, a fiber scanning display, or other display component as known in the art. The display component outputs or is adapted to output a polarized light (virtual) image, most advantageously a linearly polarized or circularly polarized image. Typically, display components such as LCD and LCoS displays produce polarized outputs. If the display output is not inherently polarized, as produced by, e.g., a micro-LED display, an OLED display, or a fiber scanning display, a polarizer, advantageously a reflective polarizer, will be disposed on the output side of the display component as known in the art to effect a desired polarization state image output.

The polarization rotator 22 can be a twisted nematic liquid crystal cell or a ferroelectric liquid crystal cell. This polarization rotator serves to switch the polarization between linearly polarized light or circularly polarized light. The polarization rotator 22 can also be disposed between the lens 23 and the electrically switchable image offset component 24.

The lens 23 can be a plano-convex lens, a biconvex lens, an aspheric lens, or a Fresnel lens. This lens serves to magnify and project the display image to a proper viewable distance which is preferably in the range from 0 to 3 diopters. The polarization dependent optical component 24, most advantageously a liquid crystal diffractive wave-plate serves to deflect the input circularly polarized light by a small angle, $d\phi$, to different direction 26, or 28 (with respect to the original direction 27) depending on the input polarization (hence the change in deflection angle is $2 \times d\phi$). By switching the polarization rotator, it induces a shift in pixels by $2 \times d\phi$ in angular space. This shift can be set so that all pixels move vertically or horizontally by the half angular pixel size ($d\theta/2$), such as the case shown in FIG. 3 (which only shows the case of shifting in the horizontal direction, but the same applies to vertical shifting). By switching on and off repeatedly, the pixels can be switched between the original location (solid lines) 31 as frame 1, and the shifted location (dashed lines) 32 as frame 2. This shift can also be set to move pixels diagonally (45° with respect to unit pixel) by approximated $\sqrt{2} \times d\theta$ as shown in FIG. 4. By switching on and off repeatedly, the pixels can be switched between the original location (solid lines) 41 as frame 1, and the shifted location (dashed lines) 42 as frame 2. Therefore, through the modulation of the voltage, spatial-shifting of the pixels can be realized. By dividing one high resolution images into two sub-frames, frame 1 and frame 2, one can provide computationally optimized images in frame 1 and frame 2 with one of the frames being shifted. The combination of these two frames of the computationally optimized image can then provide enhanced resolution for viewing. Advantageously, the switching of the polarization dependent optical component should be synchronized with the computed display sub-frame images, such that the polarization dependent optical component is switched on when frame 1 is displayed and the polarization dependent optical component is switched off when frame 2 is displayed.

FIG. 5 is a preliminary experimental result of device exploiting resolution enhancement technique disclosed in this patent. FIG. 5(*a*) shows the display image without resolution enhancement, and FIG. 5(*b*) shows the display image with resolution enhancement. The detailed texture is visible in FIG. 5(*b*) after resolution enhancement.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

We claim:

1. An optical display/view system, comprising:
   an optical image-generating apparatus, including:
   a programmable/controllable (virtual) image-generating component adapted to generate a polarized image output;
   a polarization dependent image offset component disposed to accept an output from the image-generating component, wherein the polarization dependent image offset component is configurable into a state that deflects light with a first polarization at a first angle and deflects light with a second polarization at a second angle that is different than the first angle; and
   a lens is disposed between the image-generating component and the polarization dependent image offset component.

2. The optical display system of claim 1, wherein the polarized image output is one of linear and circular polarized.

3. The optical display system of claim 1, wherein the polarization-dependent image offset component is an electrically switchable, diffractive liquid crystal wave-plate.

4. The optical display system of claim 1, wherein the image-generating component is synchronized with the image offset component.

5. The optical display system of claim 1, wherein the lens comprises an image magnification lens.

6. The optical display system of claim 1, wherein the polarization dependent image offset component comprises an optical axis grating with a thickness of about 1.5 µM.

7. The optical display system of claim 1, further comprising a polarization rotator disposed to accept the polarized image output, wherein the polarization dependent image offset component is disposed to accept an output from the polarization rotator.

8. The optical display system of claim 7, wherein the polarized image output has an original polarization and propagates through the polarization dependent image offset component at an original angle,
   wherein the polarization rotator is electrically switchable to selectively alter the polarized image output to have:
      a first polarization that is different than the original polarization; and
      a second polarization that is different than the original polarization and the first polarization,
      where the polarization dependent image offset component deflects light with the first polarization by a first angle and deflects light with the second polarization by a second angle different than the first angle.

9. The optical display system of claim 8, where the first angle differs in a first direction from the original angle by a substantially equal amount as the second angle differs from the original angle in a second direction that is different from the first direction.

* * * * *